(12) United States Patent
Chun et al.

(10) Patent No.: US 12,261,278 B2
(45) Date of Patent: Mar. 25, 2025

(54) BATTERY PACK AND DEVICE INCLUDING THE SAME

(71) Applicant: LG ENERGY SOLUTION, LTD., Seoul (KR)

(72) Inventors: Yongho Chun, Daejeon (KR); Donghyun Kim, Daejeon (KR); Byung Do Jang, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 370 days.

(21) Appl. No.: 17/767,156

(22) PCT Filed: Apr. 1, 2021

(86) PCT No.: PCT/KR2021/004054
§ 371 (c)(1),
(2) Date: Apr. 7, 2022

(87) PCT Pub. No.: WO2021/221324
PCT Pub. Date: Nov. 4, 2021

(65) Prior Publication Data
US 2022/0376325 A1    Nov. 24, 2022

(30) Foreign Application Priority Data
Apr. 28, 2020  (KR) .................. 10-2020-0051168

(51) Int. Cl.
*H01M 10/6556*  (2014.01)
*H01M 10/613*  (2014.01)
(Continued)

(52) U.S. Cl.
CPC ..... *H01M 10/6556* (2015.04); *H01M 10/613* (2015.04); *H01M 10/6554* (2015.04); *H01M 10/6568* (2015.04); *H01M 50/211* (2021.01)

(58) Field of Classification Search
CPC ................ H01M 10/613; H01M 10/65
See application file for complete search history.

(56) References Cited

U.S. PATENT DOCUMENTS

2012/0009457 A1  1/2012 Lee et al.
2012/0156543 A1  6/2012 Cicero et al.
(Continued)

FOREIGN PATENT DOCUMENTS

| CN | 108695458 A | 10/2018 |
| CN | 208127374 U | 11/2018 |

(Continued)

OTHER PUBLICATIONS

Extended European Search Report for European Application No. 21796245.5, dated Nov. 24, 2022.
(Continued)

*Primary Examiner* — Maria Laios
*Assistant Examiner* — Zackary Richard Cochenour
(74) *Attorney, Agent, or Firm* — Birch, Stewart, Kolasch & Birch, LLP

(57) ABSTRACT

A battery pack includes a plurality of battery modules; a pack coolant tube assembly disposed between the battery modules facing each other among the plurality of battery modules; a pack coolant tube lower cover for covering the lower part of the pack coolant tube assembly; a module tray located at the lower side of the pack coolant tube lower cover; and a lower housing located at the lower side of the module tray. A lower cover opening is formed in the pack coolant tube lower cover, and the lower cover opening is connected to a space formed between the module tray and the lower housing.

12 Claims, 10 Drawing Sheets

(51) Int. Cl.
  *H01M 10/6554* (2014.01)
  *H01M 10/6568* (2014.01)
  *H01M 50/211* (2021.01)

(56) References Cited

U.S. PATENT DOCUMENTS

| | | |
|---|---|---|
| 2016/0164148 A1 | 6/2016 | Yum et al. |
| 2016/0372805 A1 | 12/2016 | Kim et al. |
| 2018/0123195 A1 | 5/2018 | Fees et al. |
| 2018/0151930 A1 | 5/2018 | Kim et al. |
| 2019/0074562 A1 | 3/2019 | Kim et al. |
| 2019/0267682 A1 | 8/2019 | Seo et al. |
| 2019/0312320 A1 | 10/2019 | Uchiyama et al. |
| 2020/0067155 A1 | 2/2020 | Hwang et al. |
| 2020/0127349 A1 | 4/2020 | Park et al. |
| 2020/0168864 A1 | 5/2020 | Seo et al. |
| 2020/0185672 A1 | 6/2020 | Seo et al. |
| 2021/0143378 A1* | 5/2021 | Probert .................. B60L 50/66 |

FOREIGN PATENT DOCUMENTS

| | | |
|---|---|---|
| CN | 208400902 U | 1/2019 |
| CN | 110350116 A | 10/2019 |
| CN | 110770965 A | 2/2020 |
| EP | 3 573 129 A1 | 11/2019 |
| JP | 2011-173447 A | 9/2011 |
| JP | 2013-86641 A | 5/2013 |
| JP | 2014-26825 A | 2/2014 |
| JP | 2014-504440 A | 2/2014 |
| JP | 2016-4772 A | 1/2016 |
| JP | 2018-501603 A | 1/2018 |
| JP | 2019-536214 A | 12/2019 |
| JP | 2014-192044 A | 11/2024 |
| KR | 10-2010-0041452 A | 4/2010 |
| KR | 10-1579483 B1 | 12/2015 |
| KR | 10-2018-0061702 A | 6/2018 |
| KR | 10-2020-0001705 A | 1/2020 |
| KR | 10-2020-0020482 A | 2/2020 |
| KR | 10-2020-0021608 A | 3/2020 |

OTHER PUBLICATIONS

International Search Report (PCT/ISA/210) issued in PCT/KR2021/004054 mailed on Jul. 6, 2021.

* cited by examiner

[FIG. 1]
Conventional Art
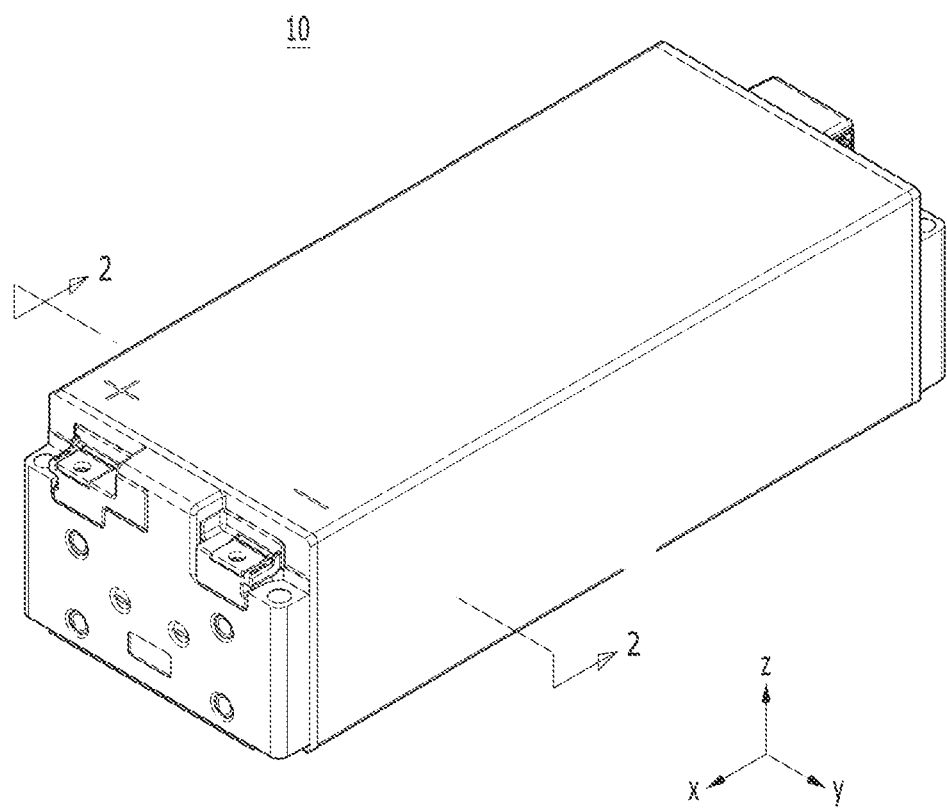

[FIG. 2]
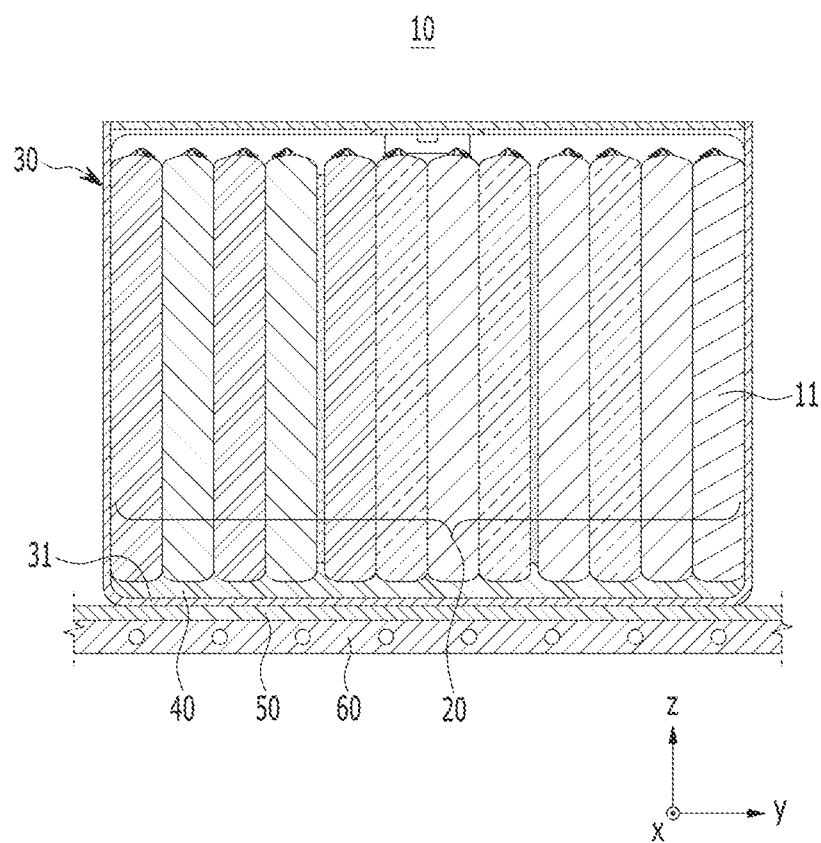

【FIG. 3】
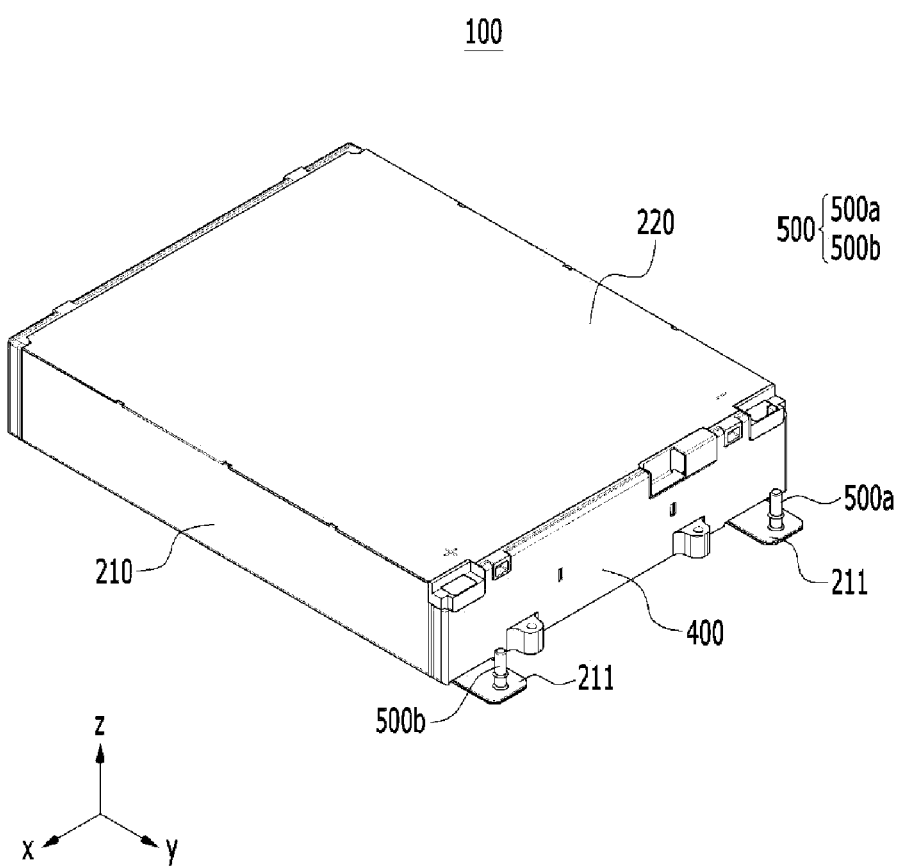

[FIG. 4]
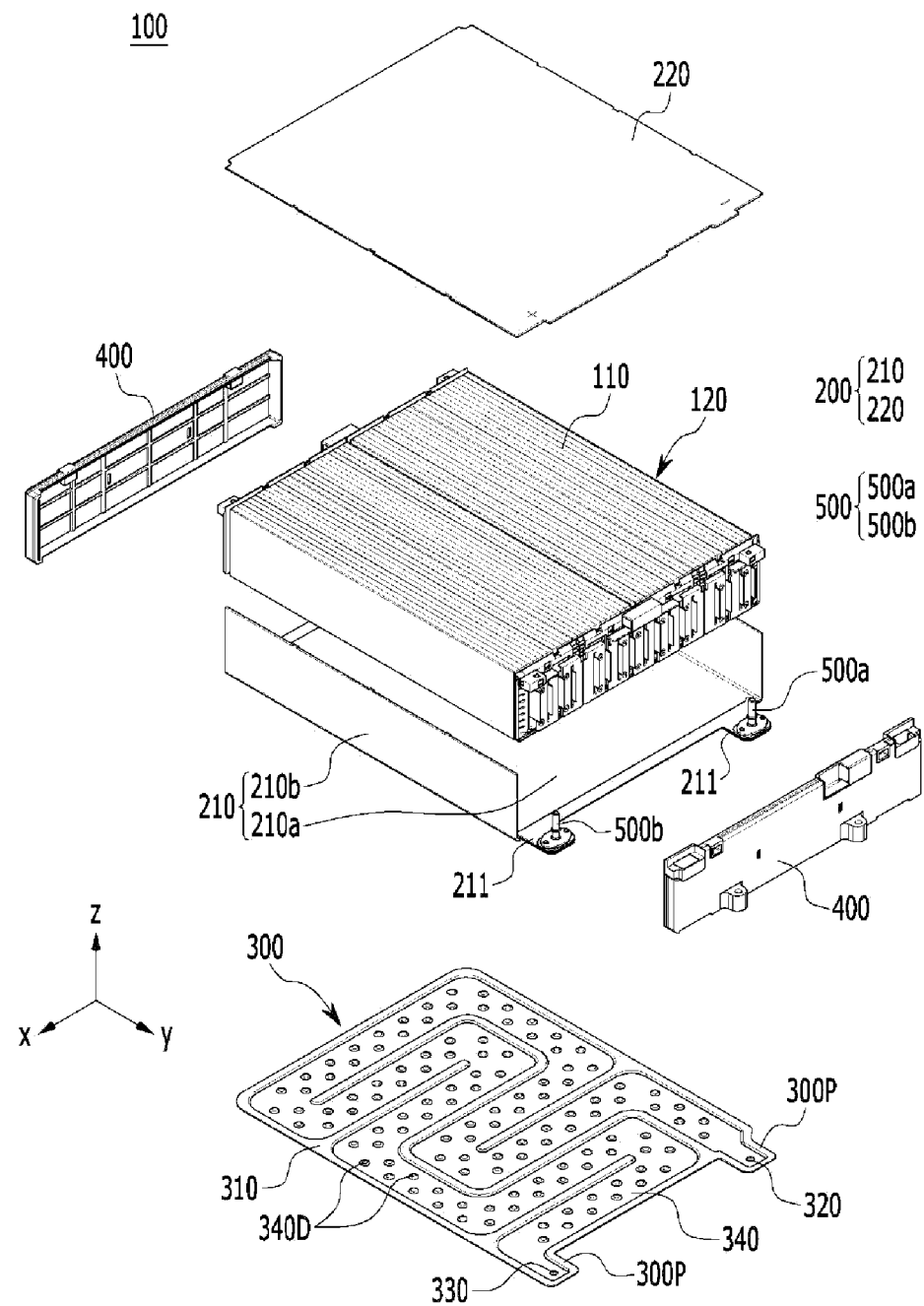

[FIG. 5]
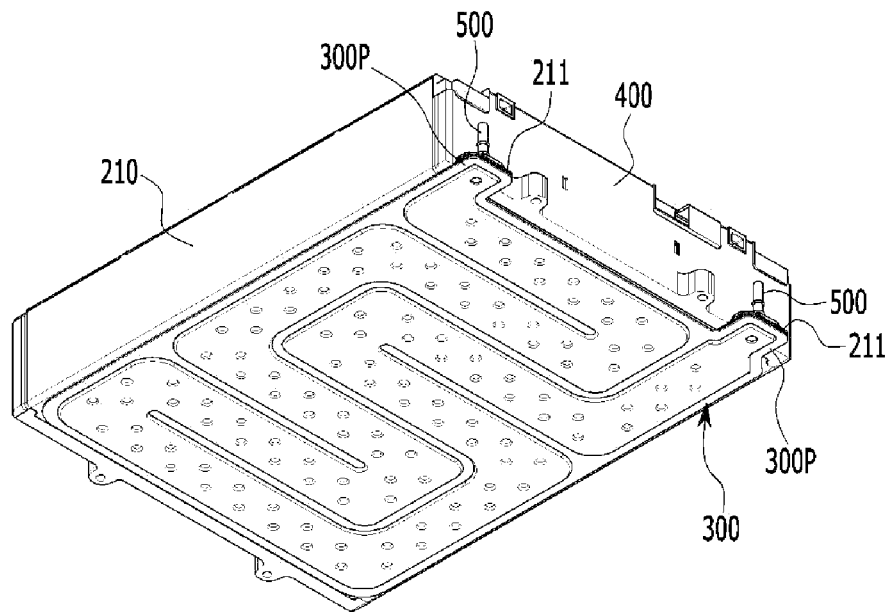
[FIG. 6]
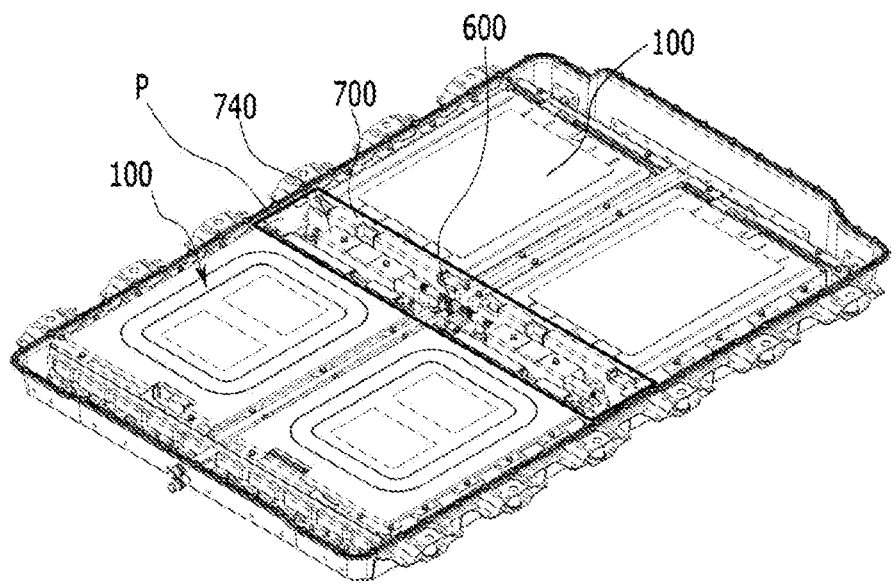

[FIG. 7]
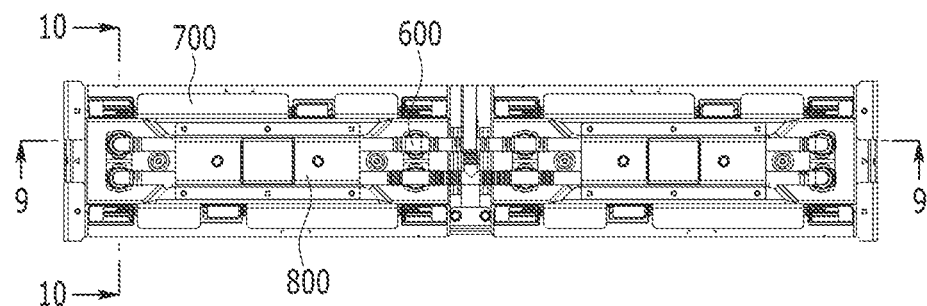
[FIG. 8]
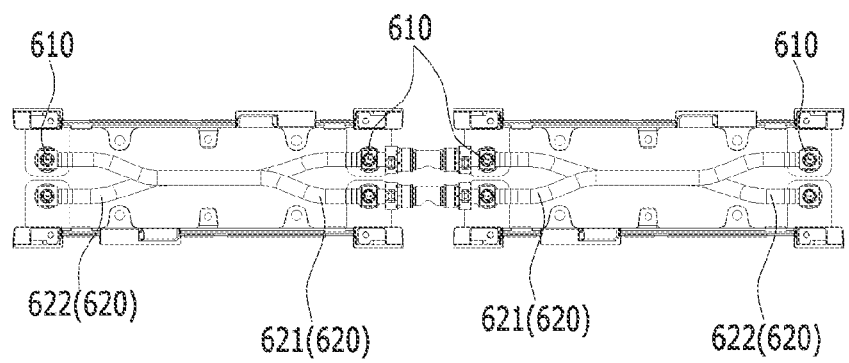

[FIG. 9]
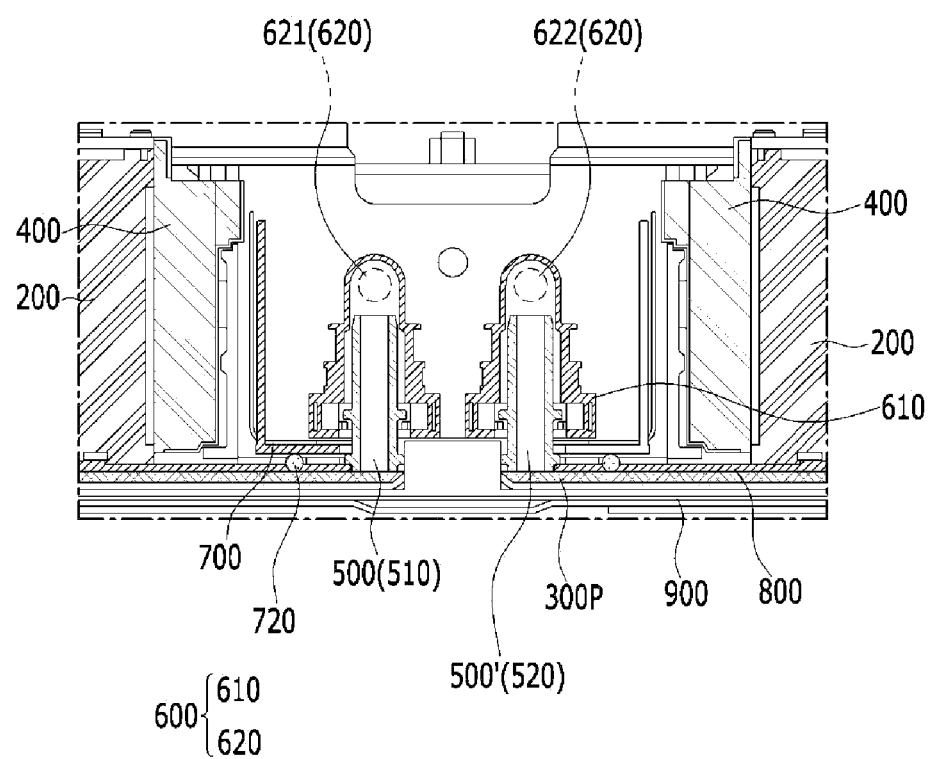

[FIG. 10]
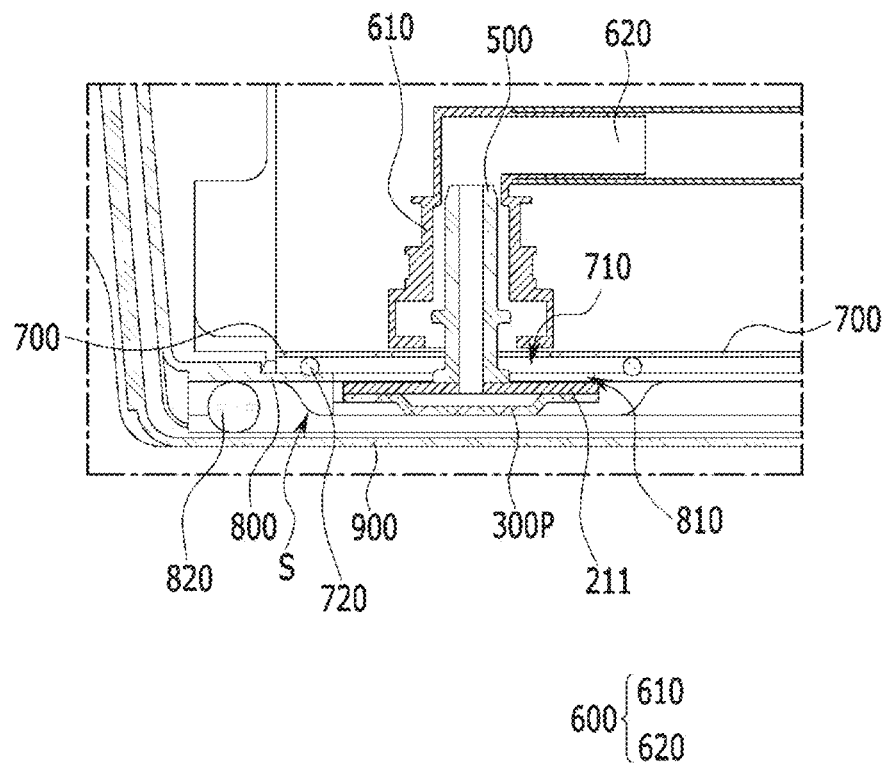
[FIG. 11]
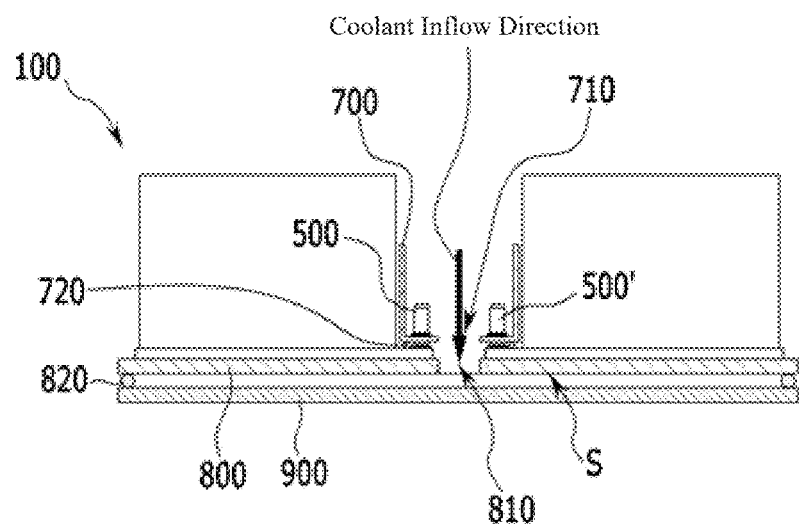

[FIG. 12]
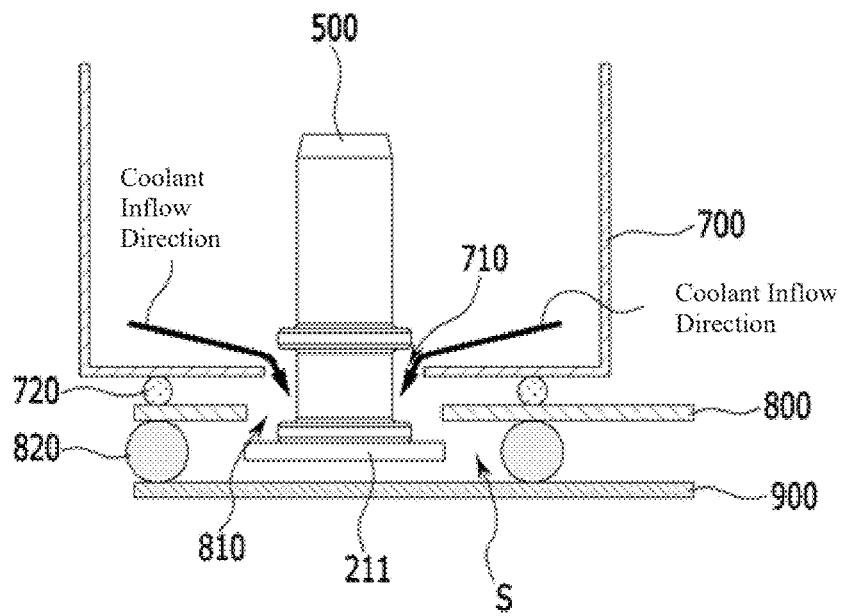

[FIG. 13]
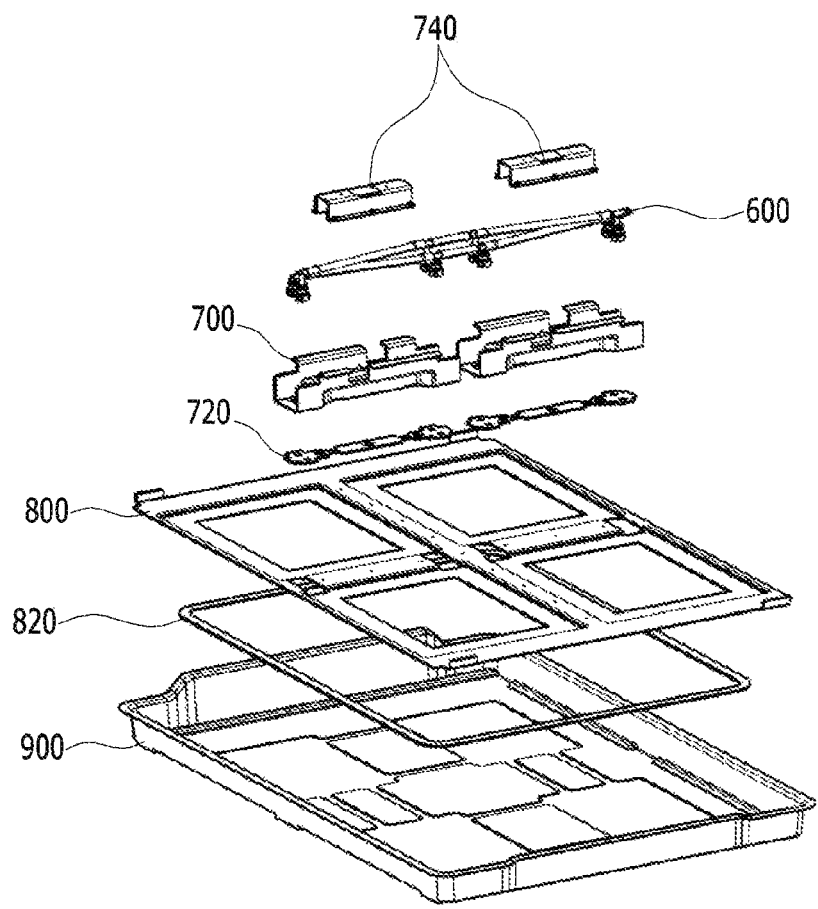

BATTERY PACK AND DEVICE INCLUDING THE SAME

CROSS CITATION WITH RELATED APPLICATION(S)

This application claims the benefit of Korean Patent Application No. 10-2020-0051168 filed on Apr. 28, 2020 with the Korean Intellectual Property Office, the disclosure of which is incorporated herein by reference in its entirety.

TECHNICAL FIELD

The present disclosure relates to a battery pack and a device including the same, and more particularly, to a battery pack preventing leakage of a coolant and a device including the same.

BACKGROUND ART

In modern society, as portable devices such as a mobile phone, a notebook computer, a camcorder and a digital camera have been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the need for development of the secondary battery is growing.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and a battery case which seals and houses the electrode assembly together with an electrolyte solution.

Generally, the lithium secondary battery may be classified based on the shape of the exterior material into a can type secondary battery in which the electrode assembly is built in a metal can, and a pouch-type secondary battery in which the electrode assembly is built in in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules can be mounted together with various control and protection systems such as a battery management system (BMS) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and severely. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition is increased.

Moreover, in the case of a battery module contained in a vehicle battery pack, it is frequently exposed to direct sunlight and can be placed under high-temperature conditions such as summer or desert areas.

Therefore, when a battery module or a battery pack is configured, it may be very important to stably and effectively ensure the cooling performance.

FIG. 1 is a perspective view of a conventional battery module. FIG. 2 is a cross-sectional view taken along the cutting line 2-2 of FIG. 1. In particular, FIG. 2 additionally shows a heat transfer member and a heat sink located under the battery module.

Referring to FIGS. 1 and 2, the conventional battery module 10 is configured such that a plurality of battery cells 11 are stacked to form a battery cell stack 20, and the battery cell stack 20 is housed in the module frame 30.

As described above, since the battery module 10 includes a plurality of battery cells 11, it generates a large amount of heat in a charge and discharge process. As a cooling means, the battery module 10 may include a thermal conductive resin layer 40 that is located between the battery cell stack 20 and the bottom portion 31 of the module frame 30. In addition, when the battery module 10 is mounted on the pack frame to form a battery pack, a heat transfer member 50 and a heat sink 60 may be sequentially located under the battery module 10. The heat transfer member 50 may be a heat dissipation pad, and the heat sink 60 may have a coolant flow path formed therein.

The heat generated from the battery cell 11 passes through the thermal conductive resin layer 40, the bottom portion 31 of the module frame 30, the heat transfer member 50, and the heat sink 60 in this order, and then is transferred to the outside of the battery module 10.

By the way, in the case of the conventional battery module 10, the heat transfer path is complicated as described above, which makes it difficult to effectively transfer the heat generated from the battery cell 11. The module frame 30 itself may deteriorate heat transfer properties, and a fine air layer such as an air gap, which can be formed in the space between the module frame 30, the heat transfer member 50, and the heat sink 60, respectively, may also be a factor that deteriorates the heat transfer properties.

As for the battery module, since other demands such as downsizing of module and an increase in capacity are also continuing, it can be said that it is practically necessary to develop a battery module capable of satisfying these various requirements while improving the cooling performance.

DETAILED DESCRIPTION OF THE INVENTION

Technical Problem

It is an object of the present disclosure to provide a battery pack having improved cooling performance, and a device pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery pack comprising: a plurality of battery modules; a pack coolant tube assembly disposed between a first battery module and a second battery module facing each other among the plurality of battery modules; a pack coolant tube lower cover for covering a lower part of the pack coolant tube assembly; a module tray located at a lower side of the pack coolant tube lower cover; and a lower housing located at a lower side of the module tray, wherein a lower cover opening is formed in the pack coolant tube lower cover, and the lower cover opening is connected to a space formed between the module tray and the lower housing.

The plurality of battery modules comprises a battery cell stack in which a plurality of battery cells are stacked; a module frame that houses the battery cell stack; a heat sink formed on the bottom portion of the module frame; and a pair of cooling ports that supply a coolant to the heat sink and discharges the coolant from the heat sink, respectively, wherein the pair of cooling ports is located on the lower cover opening.

The module frame includes a module frame protrusion part in which a part of the bottom portion of the module frame is formed in a protruding manner, and the pair of cooling ports may be formed in a protruding manner on the module frame protrusion part so as to pass through the inside of the lower cover opening from a lower side to an upper side of the pack coolant tube lower cover.

The cooling port formed in the first battery module and the cooling port formed in the second battery module are disposed so as to face each other, the lower cover opening is formed in plural numbers, and the two cooling ports disposed so as to face each other may be located together on one lower cover opening among the plurality of the lower cover openings.

The module tray includes a module tray opening, and the cooling port may be located on the module tray opening.

The lower cover opening may be connected to a space formed between the module tray and the lower housing through the module tray opening.

The battery pack further includes a module tray gasket formed between the module tray and the lower housing, wherein the module tray gasket seals between the module tray and the lower housing.

The module tray is integrally formed along an outer edge portion of each of the plurality of battery modules, and the module tray gasket may be formed along an outer edge portion of the module tray.

The battery pack further includes a lower cover gasket formed between the pack coolant tube lower cover and the module tray, wherein the lower cover gasket may seal between the pack coolant tube lower cover and the module tray.

The lower cover gasket may be formed outside the lower cover opening and the module tray opening.

The battery pack may further include a pack coolant tube upper cover for covering the upper part of the pack coolant tube assembly.

According to one embodiment of the present disclosure, there is provided a device comprising the above-mentioned battery pack.

Advantageous Effects

According to embodiments of the present disclosure, it is possible to prevent penetration of a coolant leaking into the battery module and thus minimize the possibility of a fire due to a short circuit.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module;

FIG. 2 is a cross-sectional view taken along the cutting line 2-2 of FIG. 1;

FIG. 3 is a perspective view showing a battery module according to one embodiment of the present disclosure;

FIG. 4 is an exploded perspective view of the battery module of FIG. 3;

FIG. 5 is a perspective view of the battery module of FIG. 3 as viewed from bottom to top of the battery module along the z-axis direction;

FIG. 6 is a perspective view showing a battery pack according to one embodiment of the present disclosure;

FIG. 7 is an enlarged plan view of the area indicated by P in the battery pack of FIG. 6;

FIG. 8 shows a state in which in which the pack coolant tube lower cover and the pack coolant tube upper cover are removed in FIG. 7;

FIG. 9 is a cross-sectional view taken along the cutting line 9-9 of FIG. 7;

FIG. 10 is a cross-sectional view taken along the cutting line 10-10 of FIG. 7;

FIG. 11 is a schematic diagram showing the configuration of a portion which is cut along the cutting line 9-9 of FIG. 7;

FIG. 12 is a schematic view showing the configuration of a portion which is cut along the cutting line 10-10 of FIG. 7; and FIG. 13 is an exploded perspective view of a coolant leakage preventive structure of a battery pack according to one embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The embodiments of the present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Below, a battery module according to the embodiments of the present disclosure will be described with reference to FIGS. 3 to 5.

FIG. 3 is a perspective view showing a battery module according to embodiments of the present disclosure. FIG. 4 is an exploded perspective view of the battery module of FIG. 3. FIG. 5 is a perspective view of the battery module of FIG. 3 as viewed from bottom to top of the battery module along the z-axis direction.

Referring to FIGS. 3 and 4, a battery module 100 according to embodiments of the present disclosure includes a battery cell stack 120 in which a plurality of battery cells 110 are stacked, a module frame 200 for housing battery cell stack 120, and a heat sink 300 located below the bottom portion 210a of the module frame 200. The bottom portion 210a of the module frame 200 constitutes an upper plate of the heat sink 300, and the recessed portion 340 of the heat sink 300 and the bottom portion 210a of the module frame 200 form a coolant flow path.

First, the battery cell 110 may be a pouch-type battery cell. The pouch-type battery cell may be formed by housing an electrode assembly in a pouch case of a laminate sheet including a resin layer and a metal layer, and then heat-sealing a sealing part of the pouch case. At this time, the battery cell 110 may be formed in a rectangular sheet-like structure.

The battery cells 110 may be composed of a plurality of cells, and the plurality of battery cells 110 are stacked so as to be electrically connected to each other, thereby forming a battery cell stack 120. In particular, as shown in FIG. 4, a plurality of battery cells 110 may be stacked along a direction parallel to the x-axis.

The module frame 200 for housing the battery cell stack 120 may include an upper cover 220 and a U-shaped frame 210.

The U-shaped frame 210 may include a bottom portion 210a and two side portions 210b extending upward from both ends of the bottom portion 210a. The bottom portion 210a may cover the lower surface of the battery cell stack 120, and the side portions 210b may cover both side surfaces of the battery cell stack 120.

The upper cover 220 may be formed in a single plate-shaped structure that wraps the lower surface wrapped by the U-shaped frame 210 and the remaining upper surface (z-axis direction) excluding the both side surfaces. The upper cover 220 and the U-shaped frame 210 can be joined by welding or the like in a state in which the corresponding corner portions are in contact with each other, thereby forming a structure that covers the battery cell stack 120 vertically and horizontally. The battery cell stack 120 can be physically protected through the upper cover 220 and the U-shaped frame 210. For this purpose, the upper cover 220 and the U-shaped frame 210 may include a metal material having a predetermined strength.

Meanwhile, although not specifically shown, the module frame 200 according to modified embodiments of the present disclosure may be a mono frame in the form of a metal plate in which the upper surface, the lower surface, and both side surfaces are integrated. That is, this is not a structure in which the U-shaped frame 210 and the upper cover 220 are joined with each other, but a structure in which the upper surface, the lower surface, and both side surfaces are integrated by being manufactured by extrusion molding.

The end plate 400 may be located on both open sides (y-axis direction) corresponding to each other of the module frame 200, so that it can be formed so as to cover the battery cell stack 120. The end plate 400 can physically protect the battery cell stack 120 and other electronic instruments from external impact.

Meanwhile, although not specifically shown, a busbar frame on which a busbar is mounted and an insulating cover for electrical insulation may be located between the battery cell stack 120 and the end plate 400.

The module frame 200 according to embodiments of the present disclosure includes a module frame protrusion part 211 formed so that the bottom portion 210a of the module frame 200 is extended and passes through the end plate 400. At this time, the coolant inflowing and discharging by the cooling port 500 connected to the upper surface of the module frame protrusion part 211 can be supplied to the heat sink 300 via the module frame protrusion part 211 and discharged from the heat sink 300. The cooling port 500 according to embodiments of the present disclosure includes a coolant injection port 500a and a coolant discharge port 500b, and the coolant injection port 500a and the coolant discharge port 500b can be respectively connected to a pack coolant supply tube and a pack coolant discharge tube which are described later. The module frame protrusion part 211 includes a first module frame protrusion part and a second module frame protrusion part from one side of the module frame 200, the coolant injection port 500a may be disposed on the first module frame protrusion part, and the coolant discharge port 500b may be disposed on the second module frame protrusion part.

A protrusion pattern 340D may be formed on the lower plate 310 of the heat sink 300 according to the embodiments of the present disclosure. In the case of a large-area battery module in which as in the battery cell stack 120 according to embodiments of the present disclosure, the number of stacked battery cells is increased significantly compared to a conventional case, the width of the coolant flow path be formed wider and thus, a temperature deviation can be more severe. In the large-area battery module, it may include a case in which approximately 32 to 48 battery cells are stacked in one battery module, compared to a conventional case in which approximately 12 to 24 battery cells are stacked in one battery module. In this case, the protrusion pattern 340D according to embodiments of the present disclosure can generate the effect of substantially reducing the width of the coolant flow path, thereby minimizing the pressure drop and at the same time, reducing the temperature deviation between the coolant flow path widths. Therefore, a uniform cooling effect can be realized.

Below, the heat sink according to embodiments of the present disclosure will be described in detail with reference to FIGS. 4 and 5.

Referring to FIGS. 4 and 5, as described above, the bottom portion 210a of the module frame 200 constitutes an upper plate of the heat sink 300, and a recessed portion 340 of the heat sink 300 and the bottom portion 210a of the module frame 200 form a flow path for coolant.

Specifically, a heat sink 300 may be formed at a lower part of the module frame 200, and the heat sink 300 may include a lower plate 310 that forms a skeleton of the heat sink 300 and is directly coupled to the bottom portion 210a of the module frame 200 by welding, etc., an inlet 320 that is formed on one side of the heat sink 300 to supply a coolant to the inside of the heat sink 300 from the outside, an outlet 330 that is formed on one side of the heat sink 300 and enables the coolant flowing inside the heat sink 300 to flow to the outside of the heat sink 300, and a recessed portion 340 that connects the inlet 320 and the outlet 330 and enables the coolant to flow. The inlet 320 and the outlet 330 may be formed at positions corresponding to the module frame protrusion part 211 so as to be connected to the lower surface of the module frame protrusion part 211. For this purpose, the inlet 320 and the outlet 330 may be formed on the heat sink protrusion part 300P that is protruded from one side of the heat sink 300 to the portion where the module frame protrusion 211 is located. The heat sink protrusion 300P and the module frame protrusion 211 may be directly coupled to each other by welding or the like.

The recessed portion 340 of the heat sink 300 corresponds to a portion in which the lower plate 310 is formed to be recessed on the lower side. The recessed portion 340 may be a tube in which a cross section cut perpendicularly to the xy plane with reference to the direction in which the coolant flow path extends has U-shape, and the bottom portion 210a may be located on the opened upper side of the U-shaped tube. While the heat sink 30) comes into contact with the bottom portion 210a, the space between the recessed portion 340 and the bottom portion 210a forms a region through which the coolant flows, that is, a coolant flow path. Thereby, the bottom portion 210a of the module frame 200 can come into direct contact with the coolant.

The method of manufacturing the recessed portion 340 of the heat sink 300 is not particularly limited, but by providing a structure formed so as to be recessed with respect to a plate-shaped heat sink 300, a U-shaped recessed portion 340 with an opened upper side can be formed.

Meanwhile, although not shown, a thermal conductive resin layer containing a thermal conductive resin may be located between the bottom portion 210a of the module frame 200 of FIG. 4 and the battery cell stack 120. The thermal conductive resin layer may be formed by applying a thermal conductive resin to the bottom portion 210a, and curing the applied thermal conductive resin.

The thermal conductive resin may include a thermal conductive adhesive material, and specifically, may include at least one of silicone material, urethane material, and acrylic material. The thermal conductive resin is a liquid during application but is cured after application, so that it can perform the role of fixing one or more battery cells 110 constituting the battery cell stack 120. Further, since the thermal conductive resin has excellent heat transfer properties, heat generated from the battery cell 110 can be quickly transferred to the lower side of the battery module.

The conventional battery module 10 shown in FIG. 2 is configured such that the heat generated from battery cells 11 passes through a thermal conductive resin layer 40, a bottom portion 31 of the module frame 30, a heat transfer member 50, and a coolant of a heat sink 60 in this order, and then is transferred to the outside of the battery module 10. In addition, the flow path for a coolant of the heat sink 60 is located inside the heat sink 60.

On the other hand, the battery module 100 according to embodiments of the present disclosure can realize an integrated type cooling structure of the module frame 200 and the heat sink 300, thereby further improving cooling performance. The bottom portion 210a of the module frame 200 can perform the role of corresponding to the upper plate of the heat sink 300, thereby implementing an integrated type cooling structure. The cooling efficiency due to direct cooling can be increased, and through a structure in which the heat sink 300 is integrated with the bottom portion 210a of the module frame 200, the space utilization rate on the battery module and the battery pack equipped with the battery module can be further improved.

Specifically, the heat generated from the battery cell 110 can pass through a thermal conductive resin layer (not shown) located between the battery cell stack 120 and the bottom portion 210a, the bottom portion 210a of the module frame 200, and the coolant, and then can be transferred to the outside of the battery module 100. By removing the unnecessary cooling structure according to the conventional one, the heat transfer path can be simplified and an air gap between respective layers can be reduced, and therefore, the cooling efficiency or performance can be enhanced. In particular, since the bottom portion 210a is configured by an upper plate of the heat sink 300 and the bottom portion 210a comes into direct contact with the coolant, there is an advantage that more direct cooling can be performed through the coolant. This can be distinguished from a conventional structure in which as shown in FIG. 2, the upper configuration of the heat transfer member 50 and the heat sink 60 are located between the bottom portion 31 and the coolant, which causes a reduction in the cooling efficiency.

Further, through the removal of the unnecessary cooling structure, the height of the battery module 100 is reduced and thus, the cost can be reduced and space utilization rate can be increased. Furthermore, since the battery module 100 can be disposed in a compact manner, the capacity or output of the battery pack 1000 including a plurality of battery modules 100 can be increased.

Meanwhile, the bottom portion 210a of the module frame 200 can be joined by welding to a portion of the lower plate 310 in which the recessed portion 340 is not formed among the heat sink 300. In embodiments of the present disclosure, through the integrated type cooling structure of the bottom portion 210a of the module frame 200 and the heat sink 300, it can exhibit the effects of not only improving the cooling performance described above, but also supporting the load of the battery cell stack 120 housed in the module frame 200 and reinforcing the rigidity of the battery module 100. In addition, the lower plate 310 and the bottom portion 210a of the module frame 200 are sealed by welding or the like, so that the coolant can flow without leakage in the recessed portion 340 formed inside the lower plate 310.

For effective cooling, as shown in FIG. 5, the recessed portion 340 is preferably formed over the entire region corresponding to the bottom portion 210a of the module frame 200. For this purpose, the recessed portion 340 can be curved at least one time to connect from one side to another side. In particular, for the recessed portion 340 to be formed over the entire region corresponding to the bottom portion 210a of the module frame 200, the recessed portion 340 is preferably curved several times Coolant is flown in between the bottom portion 210a and the recessed portion 340 through the inlet 320 from the pack coolant supply tube described later, and the flown-in coolant moves along the coolant flow path, and then can be discharged to the pack coolant discharge tube through the outlet 330. As the coolant moves from the start point to the end point of the coolant flow path formed over the entire region corresponding to the bottom portion 210a of the module frame 200, efficient cooling can be performed over the entire region of the battery cell stack 120.

Meanwhile, the coolant is a medium for cooling and is not particularly limited, but it may be a cooling water.

Below, the structure of the battery pack according to embodiments of the present disclosure will be described in detail with reference to FIGS. 6 to 10.

FIG. 6 is a perspective view showing a battery pack according to one embodiment of the present disclosure. FIG. 7 is an enlarged plan view of the area indicated by P in the battery pack of FIG. 6. FIG. 8 shows a state in which in which the pack coolant tube lower cover and the pack coolant tube upper cover are removed in FIG. 7. FIG. 9 is a cross-sectional view taken along the cutting line 9-9 of FIG. 7. FIG. 10 is a cross-sectional view taken along the cutting line 10-10 of FIG. 7.

Referring to FIGS. 6 to 10, the battery pack according to one embodiment of the present disclosure includes a plurality of battery modules 100, a pack coolant tube assembly 600 disposed between the battery modules facing each other among the plurality of battery modules 100, a pack coolant tube lower cover 700 for covering the lower part of the pack coolant tube assembly 600, a module tray 800 located at the lower side of the pack coolant tube lower cover 700, and a lower housing 900 located at the lower side of the module tray 800.

Referring to FIG. 6, the plurality of battery modules 100 included in the battery pack according to the embodiments of the present disclosure includes a first battery module and a second battery module that are arranged in two rows in a direction in which the battery cells are stacked, and face each other in a direction perpendicular to the direction in which the battery cells are stacked. The first battery module and the second battery module may refer to the battery modules 100 that are separated from each other on the left and right sides in FIG. 6. A pack coolant tube assembly 600, a pack coolant tube lower cover 700 and a pack coolant tube upper cover 740 may be disposed between the first battery module and the second battery module.

In embodiments of the present disclosure, the pack coolant tube assembly 600 is disposed between the battery modules 100 adjacent to each other. In a space between the battery modules 100 adjacent to each other in which the pack coolant tube assembly 600 is disposed, all of the cooling ports 500 formed in each of the battery modules 100 adjacent to each other may be disposed. At this time, a coolant injection port 510 formed in one battery module and a coolant discharge port 520 formed in another battery module 100 among the battery modules 100 adjacent to each other may be disposed while facing each other.

Referring to FIG. 8, the pack coolant supply tube 621 and the pack coolant discharge tube 622 may be extended while intersecting with each other. By having such an arrangement structure of the pack coolant tube 620, an integrated type structure of the plurality of battery modules 100 and the cooling structure can be implemented inside the battery pack, thereby enhancing the space utilization rate and at the same time, improving the cooling efficiency. The height of the pack coolant supply tube 621 and the height of the pack coolant discharge tube 622 may be different from each other, so that the pack coolant tube 620 can have the arrangement structure as described above. The portion where the height of the pack coolant supply tube 621 and the height of the pack coolant discharge tube 622 are different from each other can be partially formed.

Referring to FIGS. 8 to 10, the connection port 610 connects the cooling port 500 and the pack coolant tube 620. More specifically, the cooling port 500 includes a coolant injection port 510 and a coolant discharge port 520, the pack coolant tube 620 includes a pack coolant supply tube 621 connected to the coolant injection port 510 and a pack coolant discharge tube 622 connected to the coolant discharge port 520, and the connection port 610 may connect between the coolant injection port 510 and the pack coolant supply tube 621 and between the coolant discharge port 520 and the pack coolant discharge tube 622, respectively. The connection ports 610 are connected to coolant injection ports 510 that supply the coolant to the plurality of battery modules 100 and coolant discharge ports 520 that discharge the coolant from the plurality of battery modules 100, respectively.

The pack coolant tube lower cover 700 houses the pack coolant tube assembly 600 and covers the coolant leaked from the pack coolant tube assembly 600 so as not to leak to the peripheral battery module. At the same time, the coolant leaked through the lower cover opening described later can be guided to the lower space of the battery pack.

The module tray 800 can be formed in a structure in which it is located at the lower side of the plurality of battery modules 100 and thus, the plurality of battery modules 100 can be disposed and seated at a designated position. In addition, a plurality of battery modules 100 are disposed so as to be separated from each other through the module tray 800, and a space for component arrangement may be provided so that the pack coolant tube assembly 600 can be located in the separated space.

As shown in FIG. 10, the lower housing 900 is located at the lower side of the module tray 800. A space S is formed between the lower housing 900 and the module tray 800. According to embodiments of the present disclosure, the lower cover opening 710 is formed in the pack coolant tube lower cover 700, and the lower cover opening 710 is connected to a space S formed between the module tray 800 and the lower housing 900. Therefore, the coolant leaked from the pack coolant tube assembly 600 can be guided to a space S formed between the module tray 800 and the lower housing 900 through the lower cover opening 710.

In a cooling structure using a fluid, it is possible to generate a situation where the coolant leaks due to defective products or accidents during transportation of products, and the leaked coolant penetrates into the inside of electrical components to cause a short-circuit, whereby there is a danger of causing a fire in the battery pack. Therefore, when the coolant leaks, it is necessary to prevent the leaked coolant from penetrating into the electrical components in advance.

Thus, according to embodiments of the present disclosure, when the coolant leaks from the various members forming the cooling structure and the connection parts of those members, the is guided to a predetermined path and stored in the space S between the module tray 800 and the lower housing 900 under the battery pack, thereby capable of penetrating the leaked coolant into the inside of the electrical components and preventing in advance the possibility of the occurrence of a fire through a short circuit.

Below, a coolant induction structure according to one embodiment of the present disclosure will be described in more detail with reference to FIGS. 9 to 13.

FIG. 11 is a schematic diagram showing the configuration of a portion which is cut along the cutting line 9-9 of FIG. 7. FIG. 12 is a schematic view showing the configuration of a portion which is cut along the cutting line 10-10 of FIG. 7. FIG. 13 is an exploded perspective view of a coolant leakage preventive structure of a battery pack according to one embodiment of the present disclosure.

Referring to FIG. 12, the cooling port 500 according to the embodiments of the present disclosure may be located on the lower cover opening 710. More specifically, the cooling port 500 may be formed on the module frame protrusion part 211 so as to pass through the inside of the lower cover opening 710 from the lower side to the upper side. Through this, the coolant leaked from the cooling port 500, the connection port 610 connected thereto, and the pack coolant tubes 620 can be guided to the lower space S through the lower cover opening 710.

Referring to FIGS. 9 and 11, among the battery modules 100 facing each other, the cooling port 500 formed in one battery module and the cooling port 500' formed in another battery module are disposed so as to face each other, the lower cover opening 710 is formed in plural numbers, and the two cooling ports 500 and 500' disposed so as to face each other may be located together on one lower cover opening among the plurality of the lower cover openings 710. Thereby, the coolant leaked from the two cooling ports 500 and 500' facing each other and located adjacent to each other can be guided to the lower space S at once.

The module tray 800 includes a module tray opening 810, and the cooling port 500 may be located on the module tray opening 810. At this time, the lower cover opening 710 may be connected to a space S formed between the module tray 800 and the lower housing 900 through the module tray opening 810.

According to embodiments of the present disclosure, the battery pack may further include a module tray gasket 820 formed between the module tray 800 and the lower housing 900. The module tray 800 is integrally formed along the outer edge portion of each of the plurality of battery modules 100, and the module tray gasket 820 may be formed along an outer edge portion of the module tray 800. The module tray gasket 820 can seal between the module tray 800 and the lower housing 900. Thereby, the coolant flowing into the space S between the module tray 800 and the lower housing 900 can be prevented from leaking to the outside.

The battery pack may further include a lower cover gasket 720 formed between the pack coolant tube lower cover 700 and the module tray 800. The lower cover gasket 720 may be formed outside the lower cover opening 710 and the module tray opening 810. The lower cover gasket 720 can seal between the pack coolant tube lower cover 700 and the module tray 800. In order to prevent the coolant flowing in through the lower cover opening 710 from leaking between the module tray 800 and the pack coolant tube lower cover 700, the lower cover gasket 720 seals between the module tray 800 and the pack coolant tube lower cover 700, and the coolant passing through the lower cover opening 710 can pass through the module tray opening 810 and flow in a space S between the module tray 800 and the lower housing 900 without leakage.

According to the embodiments of the present disclosure, as shown in FIG. 13, the battery pack may further include a pack coolant tube upper cover 740 for covering the upper part of the pack coolant tube assembly 600. The pack coolant tube upper cover 740 may physically protect the pack coolant tube assembly 600 from external impact together with the pack coolant tube lower cover 700.

The battery pack according to embodiments of the present disclosure described above can have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred to embodiments, the scope of the present disclosure is not limited thereto, and numerous other modifications and embodiments made by those skilled in the art will also fall within the spirit and scope of the principles of the invention described in the appended claims.

DESCRIPTION OF REFERENCE NUMERALS

200: module frame
211: module frame protrusion part
300: heat sink
500: cooling port
600: pack coolant tube assembly
610: connection port
620: pack coolant tube
621: pack coolant supply tube
622: pack coolant discharge tube
700: pack coolant tube lower cover
710: lower cover opening
720: lower cover gasket
740: pack coolant tube upper cover
800: module tray
810: module tray opening
820: module tray gasket
900: lower housing

The invention claimed is:
1. A battery pack comprising:
a plurality of battery modules;
a pack coolant tube assembly disposed between a first battery module and a second battery module facing each other among the plurality of battery modules;
a pack coolant tube lower cover for covering a lower part of the pack coolant tube assembly;
a module tray located at a lower side of the pack coolant tube lower cover; and
a lower housing located at a lower side of the module tray,
wherein a lower cover opening is formed in the pack coolant tube lower cover, and the lower cover opening is connected to a space formed between the module tray and the lower housing.

2. The battery pack of claim 1, wherein each of the plurality of battery modules comprises:
- a battery cell stack in which a plurality of battery cells are stacked;
- a module frame that houses the battery cell stack;
- a heat sink formed on a bottom portion of the module frame; and
- a pair of cooling ports that supply a coolant to the heat sink and discharges the coolant from the heat sink, respectively,
- wherein the pair of cooling ports is located on the lower cover opening.

3. The battery pack of claim 2, wherein:
- the module frame comprises a module frame protrusion part in which a part of the bottom portion of the module frame is formed in a protruding manner, and
- wherein the pair of cooling ports is formed in a protruding manner on the module frame protrusion part so as to pass through the inside of the lower cover opening from a lower side to an upper side of the pack coolant tube lower cover.

4. The battery pack of claim 2, wherein:
- the pair of cooling ports formed in the first battery module and the pair of cooling ports formed in the second battery module are disposed so as to face each other,
- wherein the lower cover opening is formed in plural numbers, and
- wherein the two cooling ports disposed so as to face each other are located together on one lower cover opening among the plurality of the lower cover openings.

5. The battery pack of claim 2, wherein:
- the module tray comprises a module tray opening, and
- the pair of cooling ports is located on the module tray opening.

6. The battery pack of claim 5, wherein:
- the lower cover opening is connected to a space formed between the module tray and the lower housing through the module tray opening.

7. The battery pack of claim 1, further comprising a module tray gasket formed between the module tray and the lower housing,
- wherein the module tray gasket seals between the module tray and the lower housing.

8. The battery pack of claim 7, wherein:
- the module tray is integrally formed along an outer edge portion of each of the plurality of battery modules, and
- the module tray gasket is formed along an outer edge portion of the module tray.

9. The battery pack of claim 1, further comprising a lower cover gasket formed between the pack coolant tube lower cover and the module tray,
- wherein the lower cover gasket seals between the pack coolant tube lower cover and the module tray.

10. The battery pack of claim 9, wherein:
- the lower cover gasket is formed outside the lower cover opening and the module tray opening.

11. The battery pack of claim 1, further comprising a pack coolant tube upper cover for covering the upper part of the pack coolant tube assembly.

12. A device comprising the battery pack of claim 1.

* * * * *